United States Patent [19]

Gode

[11] 4,188,764
[45] Feb. 19, 1980

[54] PREFABRICATED GREENHOUSE STRUCTURE

[76] Inventor: Charles R. Gode, 2521 Armour La., Redondo Beach, Calif. 90278

[21] Appl. No.: 892,776

[22] Filed: Apr. 3, 1978

[51] Int. Cl.² .............................................. F04C 1/10
[52] U.S. Cl. .................................... 52/582; 52/586; 52/656; 160/392
[58] Field of Search ................ 52/63, 222, 775, 586, 52/582, 656, 581, 584; 160/392, 395, 371

[56] References Cited

U.S. PATENT DOCUMENTS

| 2,882,564 | 4/1959 | Couse et al. ........................ 52/586 X |
| 3,100,012 | 8/1963 | Dunn ................................. 160/392 X |
| 3,143,165 | 8/1964 | Lewis et al. ....................... 160/392 X |
| 3,222,841 | 12/1965 | Lipof ................................... 52/63 |
| 3,848,390 | 11/1974 | Anderson et al. ................. 52/656 X |
| 4,057,941 | 11/1977 | Schwartz ........................... 52/222 X |

Primary Examiner—Carl D. Friedman
Attorney, Agent, or Firm—Spensley, Horn & Lubitz

[57] ABSTRACT

The invention concerns a prefabricated building structure, one which employs a series of structural elements of novel design that permits even an inexperienced person to quickly and easily assemble a building. These structural elements all are designed to hold taught at least one flexible sheet spanning the space defined by the elements, this sheet being received, with a resilient spline, in a keyhole-shaped slot provided in each structural member, this slot being of a unique design. A minimum of different structural elements are employed in the building, these different structural elements all being described in the following specification.

33 Claims, 20 Drawing Figures

U.S. Patent   Feb. 19, 1980   Sheet 1 of 4   4,188,764
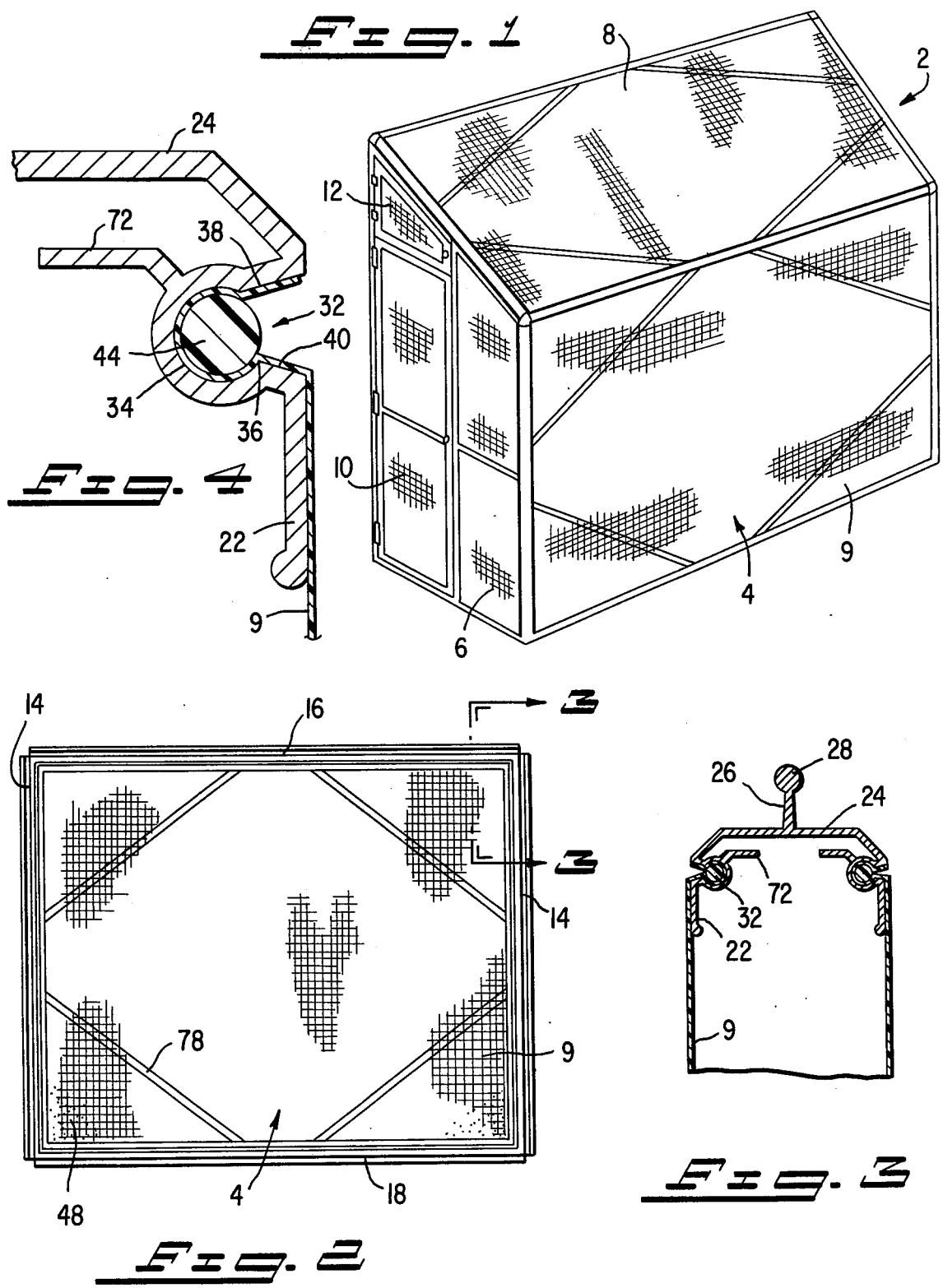

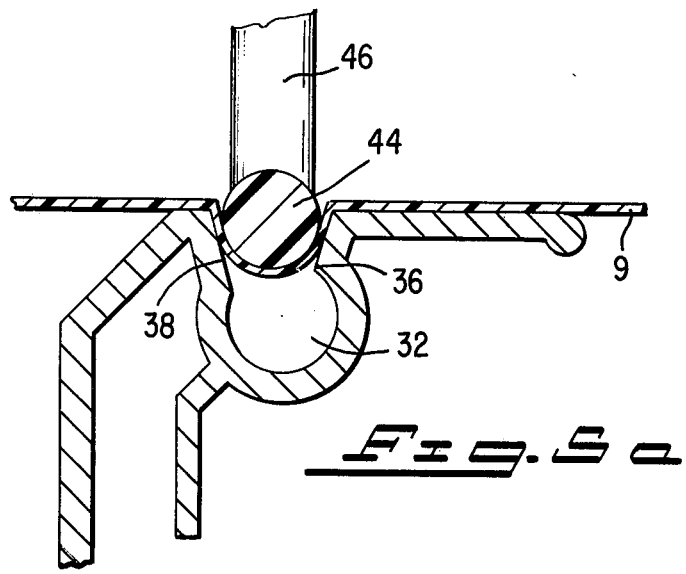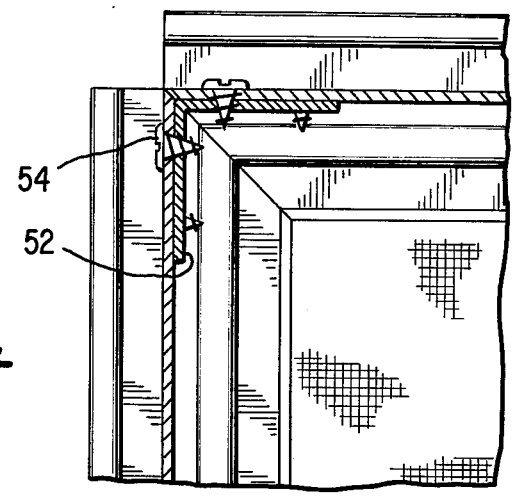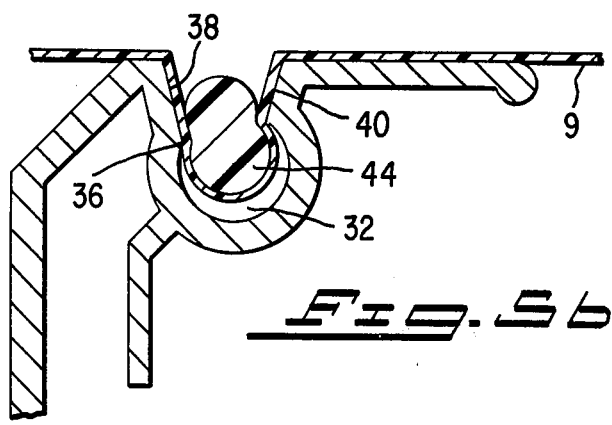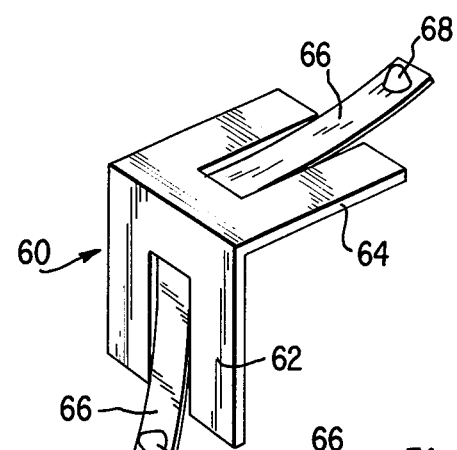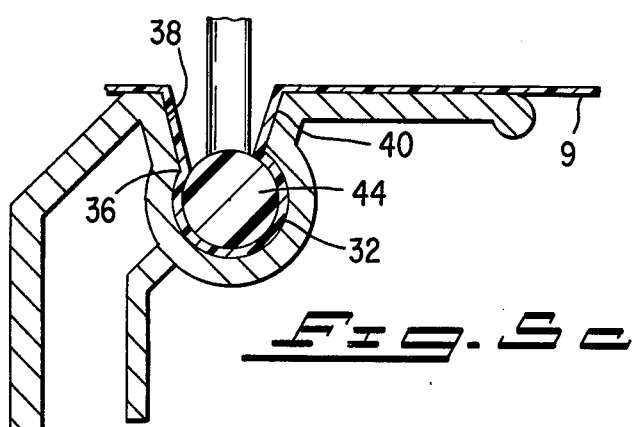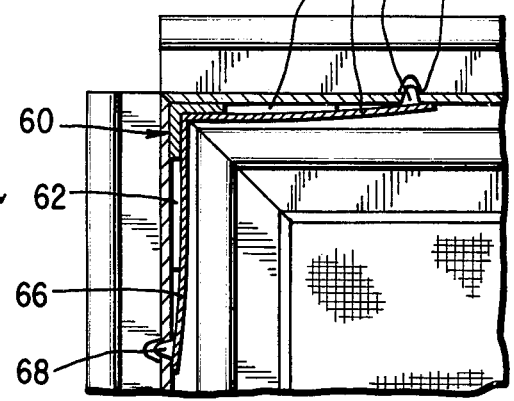

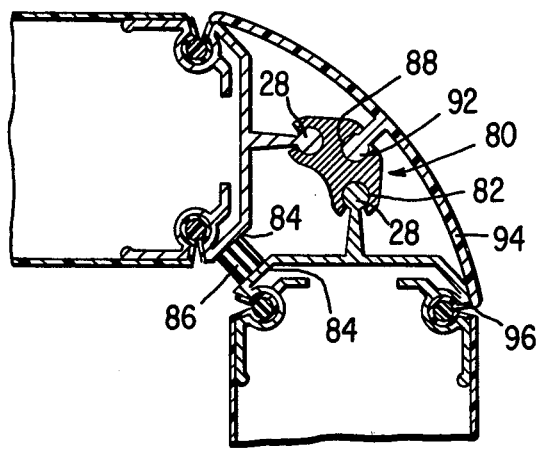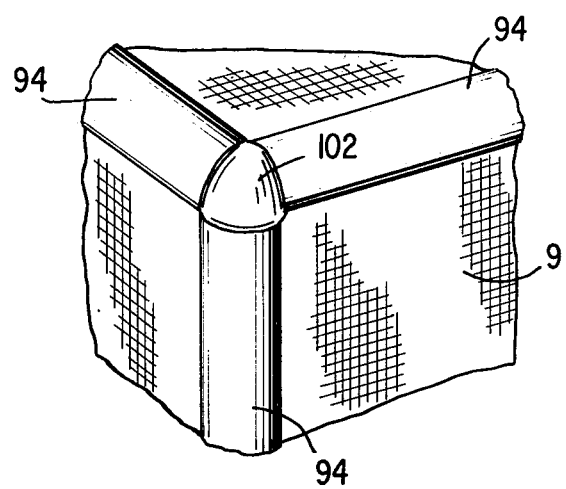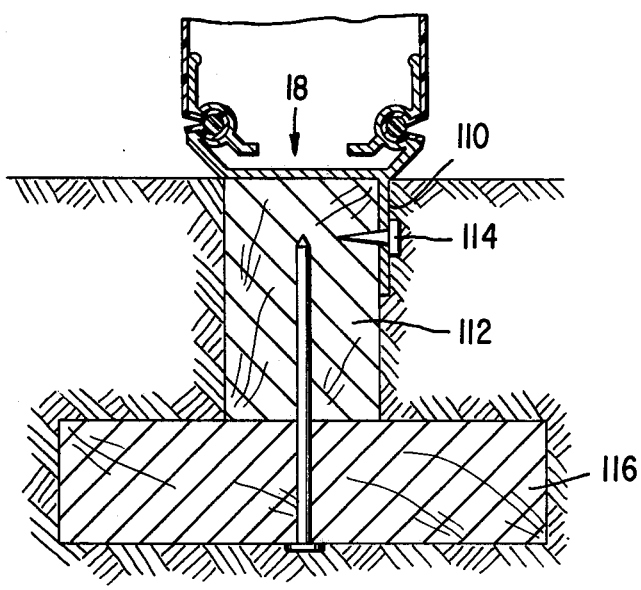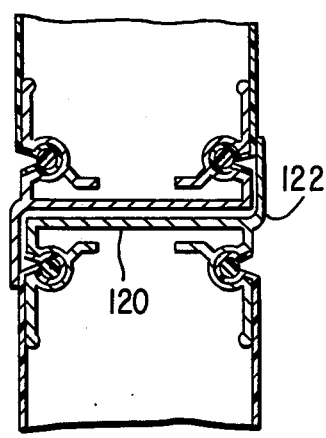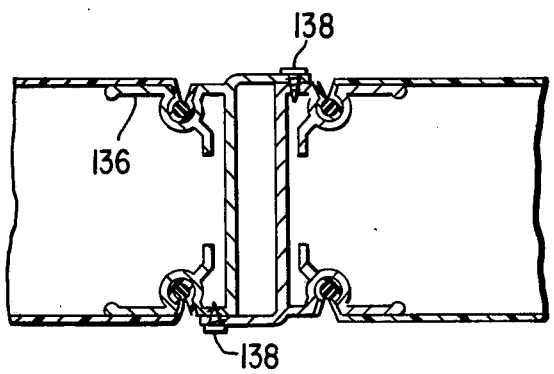

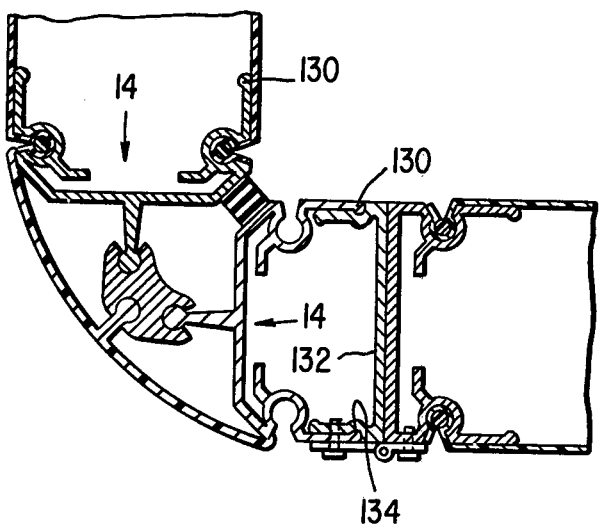
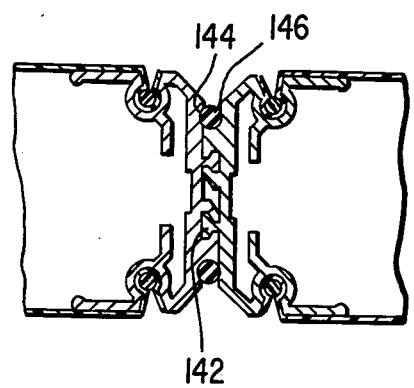
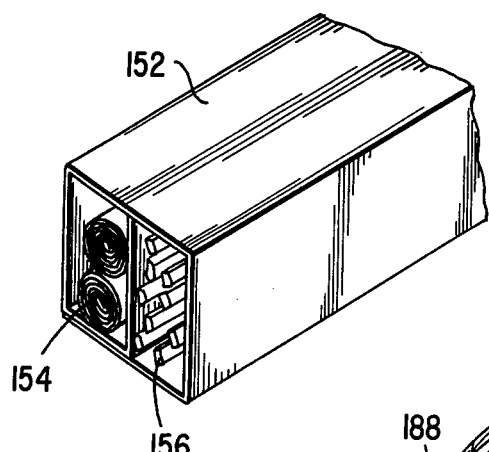
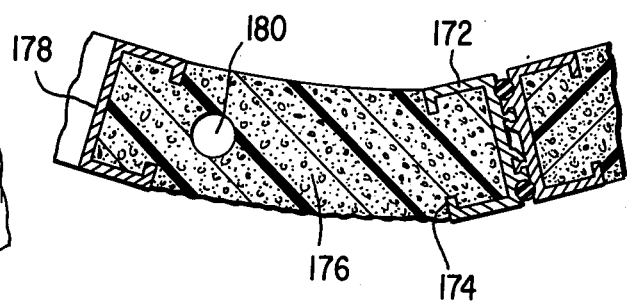
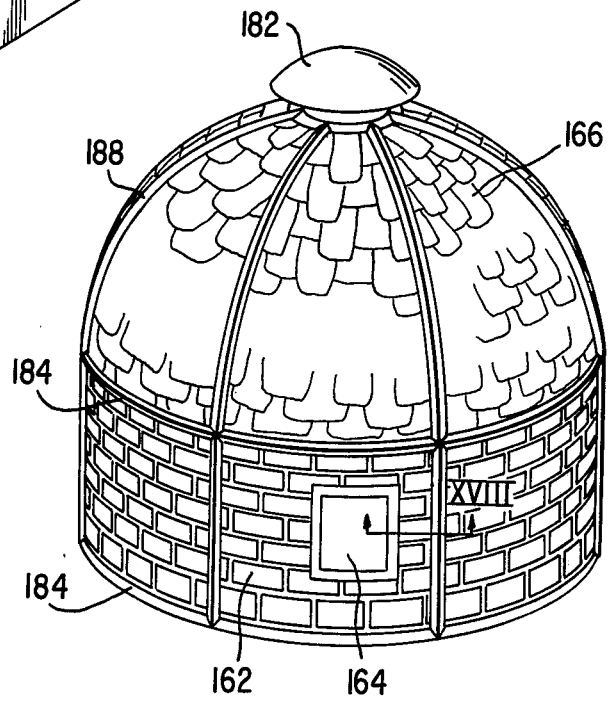

PREFABRICATED GREENHOUSE STRUCTURE

BACKGROUND OF THE DISCLOSURE

The invention relates to a prefabricated building structure, particularly one suitable for use as a greenhouse.

A wide variety of prefabricated building structures have been designed; many are in current use today. For the most part, they include rigid wall panels which are supported by, and span the space between, the various frame members of the building. Their assembly typically employs mechanical elements such as screws or nails, and requires appreciable skill in the use of various tools by the person or persons who erect the structure. Further, such building structures are usually bulky to package and ship, largely because of the panels employed, usually do not offer significant insulation, and can be fairly expensive, although not usually anywhere near as expensive as a custom-built structure.

Some such prefabricated structures have been designed specifically to serve greenhouses. While they typically permit the use of glass or fiberglass panels to span the spaces between the skeletal elements of the building, some designs employ flexible sheets. One significant problem presented by such greenhouse structures employing flexible sheets is the lack of insulation afforded by such sheets. Further, such prefabricated structures usually are designed to a particular floor plan, and do not permit significant variation from that floor plan without extensive modification of the elements employed.

An object of the present invention is to provide an economical building structure, one which is easily erected even by an inexperienced user in a minimal amount of time. Another object is to provide such a building structure with significant insulation against environmental extremes of temperature. A further object is to provide a building structure consisting of components which, when disassembled, may be packaged in a minimal space for shipment. A further object is to provide such a building structure that is particularly suited to serve as a greenhouse, one which is easily adapted to any desired floor plan. These and further objects of the invention will be apparent from the following description of a preferred embodiment of the building structure and preferred embodiments of various of its components.

BRIEF SUMMARY OF THE INVENTION

The building structure of the invention, in its preferred form, employs as its skeletal elements channel members, each of which may include a longitudinal groove for receiving both an edge portion of a flexible sheet and a resilient spline, holding the edge portion of the sheet in the groove and resisting tension in the sheet. Thus, the channel members forming the skeleton of the building structure will hold a flexible sheet to span the space between the channel members. The longitudinal groove in each channel member preferably is generally keyhole-shaped in cross-section, the keyhole including a generally circular interior head opening, a constricted throat portion and planar side portions, these side portions being contiguous with the side wall of the channel member. The side portion of the keyhole-shaped opening over which the flexible sheet edge portion under tension passes defines an angle with the plane tangent to the interior head opening at their line of intersection that is preferably greater than the angle defined by the other side portion with the plane tangent to the interior head opening at their line of intersection; that is, the sheet doubles back on itself at this junction at an angle significantly greater than that at which it leaves the opening. Because of this particular design, much of the tension in the sheet will be transferred to the channel member at this junction; and not transferred to the resilient spline received within the interior head opening of the longitudinal groove. Further, because of the preferred design of the keyhole-shaped longitudinal groove, the resilient spline will be securely captured under the overhang within the interior head opening provided by this junction to resist such tension in the sheet as is transferred to it.

The various channel members also include means for connecting them to adjacent, generally parallel channel members. For such adjacent channel members holding sheets or panels that lie generally in the same plane, preferably such interconnecting means include raised portions designed to interlock within an identical, adjacent channel member, and preferably grooved for receiving resilient splines to seal the adjacent channel members to one another. For such adjacent channel members which hold panels or flexible sheets lying in planes at substantial angles to one another, such as at a right angle, preferably each channel member includes a planar wall portion connected to, and offset from, the side wall, this planar wall portion terminating in an outer enlarged boss, permitting a link member to receive and slide over such parallel bosses thereby capturing within it each boss to interconnect such adjacent channel members. Preferably, the size of the side wall and planar wall is such that adjacent, similar channel members abut when their respective flexible sheet planes are at approximately right angles to one another. Also, preferably a molding panel is attached to these adjacent channel members, as for example by being attached to the link member, and spans and seals the exterior space between these adjacent, interconnected channel members.

To interconnect intersecting channel members, preferably an angle bracket is employed which may be received in longitudinal slots provided in the intersecting channel members. Further, preferably this angle bracket includes a flexible finger that snaps into an opening provided in each channel member which receives it to lock the angle member to the channel member, whereby adjacent, intersecting channel members easily may be snapped together by employing such an angle bracket.

While this summary of the invention briefly describes certain major elements of the invention, other novel elements, and the details of these major elements, are set forth in the following specification and described with particularity in the appended claims.

BRIEF DESCRIPTION OF THE DRAWINGS

The new building structure will be described in connection with the accompanying drawings, in which:

FIG. 1 is a perspective view of one embodiment of the new building structure;

FIG. 2 is a plan view of a basic panel element employed in the building structure;

FIG. 3 is a cross-sectional view taken along lines 3—3 of FIG. 2 showing a channel member in a preferred design;

FIG. 4 is an enlarged view of the keyhole-shaped longitudinal groove of the channel member shown in FIG. 3;

FIGS. 5a, 5b and 5c are cross-sectional views of a portion of the channel member showing the sheet edge and spline in the process of being inserted into the longitudinal groove;

FIG. 6 is a cross-sectional view of a corner portion of the basic building panel shown in FIG. 2;

FIG. 7 is a perspective view of a unique corner bracket employed to interlock intersecting channel members;

FIG. 8 is a cross-sectional view similar to FIG. 6, showing a corner of the building panel with intersecting channel members interlocked by the unique angle bracket;

FIG. 9 is a cross-sectional view of a corner of the building showing interlocked adjacent channel members;

FIG. 10 is a perspective view of a corner portion of the new building structure;

FIG. 11 is a cross-sectional view of a base portion of the building;

FIG. 12 is a cross-sectional view of a door-jamb portion of the building;

FIG. 13 is a cross-sectional view of a corner portion including of the new building structure, this corner portion including a door or window;

FIG. 14 is a cross-sectional view of two adjacent, attached channel members;

FIG. 15 is a cross-sectional view of adjacent channel members interlocked by mating protrusions;

FIG. 16 is a view of an end portion of a carton housing the various elements of the building structure for storage and shipment;

FIG. 17 is a perspective view of another prefabricated building structure; and

FIG. 18 is a cross-sectional view, taken on line XVIII of FIG. 17, of a portion of the wall of that structure.

DETAILED DESCRIPTION

A preferred version of the new building structure provides an ideal greenhouse. While this version of the structure will be described in connection with the accompanying drawings, and one other application also is illustrated and described, it will be apparent to those skilled in this field that the new building structure is capable of many other applications. For example, by employing flexible sheets all of which are opaque a dark room easily can be achieved. As another example, by employing some flexible sheets which are transparent and others which are opaque, a building structure quite suitable for human occupancy can be obtained. Of course, all of these building structures can, by inclusion of suitable environmental control equipment, provide an included environment suitable for most any desired condition. For example, if suitable filtering equipment is provided, a clean room environment can be obtained. In short, while a preferred embodiment of the new building structure is described in the following specification, the building structure is uniquely adaptable and versatile, as will be recognized by designers skilled in this field.

In describing preferred embodiments of the new building structure, preferred designs of the components will be set forth. Of course, various other designs of these components may be preferred by others, and even may be preferred by the inventor for other applications or to provide other capabilities. For these reasons, while preferred embodiments of the building structure are described, the invention should not be in any way construed as being limited to such preferred embodiments.

Shown in FIG. 1 is a building structure 2 which incorporates many of the features offered by this invention. This building structure includes side wall panels 4, end panels 6, and a roof panel 8. These panels are covered with sheets 9 of a transparent material, such as a reinforced vinyl or any other equivalent type of flexible plastic. Since such a material often is offered in a maximum width of 8 feet, the dimensions of such a basic building structure as shown in FIG. 1 may be 5 feet wide by 8 feet long, 6 feet 6 inches high at the lower side of the roof and 7 foot 6 inches high at the higher side of the room, this slope of the roof being sufficient for adequate rain drainage. The front wall of the building structure may include a door 10 and a window 12 if desired. Of course, similar components may be included in other walls, such as the back wall. Also, while this building structure is illustrated as resting on earth, it may of course be erected in and supported on a variety of other structures, such as for example an apartment house balcony. Also, which the stated transparent covering material 9 is preferred for greenhouse applications, a variety of other flexible sheet materials or panels may be employed, and may be preferred particularly for certain other applications such as to provide a dark room. Further, while the building structure illustrated in FIG. 1 is simple and basic, should a larger building structure be desired, it will be apparent to designers skilled in this field that this structure readily may be extended indefinitely both longitudinally and laterally to achieve an enclosed floor area of almost any desired size.

The side wall panel 4 is shown in FIG. 2. This panel incorporates many of the basic elements of the building structure. It includes two vertical channel members 14 as well as two horizontal channel members, a top channel 16 and a bottom channel 18. A preferred form of vertical channel 14 is illustrated in cross-section in FIG. 3. It may be thought of, in its most basic sense, as being "U" shaped, the "U" being defined by side walls 22 and a base wall 24. Attached at the mid portion of base 24 is a planar wall 26. This planar wall defines a plane generally parallel to, but offset from those planes defined by side walls 22. It extends, as shown in FIG. 3, from base 24 in a direction opposite to the direction of side walls 22. This planar wall, together with the base and side walls, defines a generally "Y" shaped channel in cross-section. Planar wall 26 includes as its outer end an enlargement or boss 28.

Each side wall preferably includes a longitudinal groove 32 which, in cross-section, is keyhole-shaped, as illustrated in FIG. 4. This longitudinal groove 32 includes an interior, generally circular-shaped head opening 34, a constricted throat portion 36, and planar side portions 38 and 40. A particular shape for this keyhole-shaped opening is preferred, since this shape has been found to be excellent for capturing and holding an edge portion of the flexible sheet 9 to the channel member. Specifically, side portion 40, the portion over which the edge of the flexible sheet 9 under tension passes, intersects the circular head opening 34 at an angle (the angle being defined by the plane of side portion 40 and the plane tangent to the opening at the line of intersection) which is greater (considering the angle through which the sheet turns) than the angle at which the other side portion, side portion 38, intersects opening 34. Thus, because of this sharp angle much of the tension in the flexible sheet is transmitted to the channel member as the sheet passes over this angle. Also, by this design an appreciable overhang portion of the circular head of opening is provided, this overhang significantly assisting in holding the spline and flexible sheet captioned within the groove as will be further described herein.

The constricted throat portion 36 is defined by the intersection of side portions 38 and 40 with the circular-shaped interior head opening 34. To capture the edge portion of the flexible sheet within the head opening 34, a resilient spline 44 is forced, with the sheet, through throat 36 and into the head opening, the spline expanding to, with the resilient sheet, substantially fill the head opening. Because of the design of the keyhole-shaped opening, as the resilient spline is forced, with the sheet, into the head opening, the tension in the body of the sheet tends to be increased.

This important effect is further illustrated in FIGS. 5a, 5b and 5c. FIG. 5a shows, in partial cross-section, a channel member in which the longitudinal groove 32 has just begun to receive spline 44 and edge portion of sheet 9. The spline is forced by a relatively wide, conventional roller tool 46, together with the underlying portion of the sheet, down between planar side portions 38 and 40 of the groove, which serves to guide this insertion, and is captured in throat 36, as shown in FIG. 5b. As this insertion proceeds, preferably the assembler holds the free end portion of the sheet 9 under slight tension, mainly to hold the sheet reasonably taught and properly aligned with the groove. After the entire sheet has been seated as shown in FIG. 5b, with the spline captured in the throat of the keyhole-shaped opening, the assembler inspects the resultant assembly to make sure that it is proper and satisfactory. Then, using a narrower roller tool than shown in FIG. 5a, the assembler forces spline 44 and its underlying sheet into the head opening of the keyhole-shaped opening, resulting in the spline and sheet edge being seated within the opening as shown in FIG. 5c.

Since the side portion of the groove over which the sheet edge under tension passes, i.e., side portion 40, defines an angle with respect to the circular head opening which is significantly greater than the angle at which the other side portion intersects the circular head opening 34, a significant overhang is formed under this lip. As the spline expands upon insertion into the head opening, it forces the sheet to fill the space under this overhang. From experience gained through repeatedly using such a keyhole-shaped opening to capture a sheet, it appears that as the spline is expanding to fill this space under the overhang, it pulls the adjacent portion of the sheet with it, causing the body of the sheet to be further tightened. Also, this sharp overhang appears to receive and bear a significant amount of the tension in the sheet, preventing this tension from being transmitted directly to the spline to roll it out of the circular head opening 32. In fact, when the head opening and spline are configured relative to one another as indicated in these figures, once the spline has been seated in the head opening to capture the sheet, it is exceedingly difficult to remove the sheet by pulling on the free end of the sheet or by further tensioning the body of the sheet. However, by locating a free end of the spline in the groove and prying it from the longitudinal groove, it is possible to strip the remainder of the spline quite easily from the groove to free the sheet. Preferably the side portions 38 and 43 are each at an angle of about 15° to a plane perpendicular to the side wall of the channel member, and intersect the head opening at angles that are, with respect to such a plane and the center of the head opening, approximately 30° for side portion 40 and 60° for side portion 38, respectively.

Preferably such a longitudinal groove is provided in both side walls of the channel member, permitting either one or two flexible sheets to be carried by the channel member. Thus, each panel of the building structure may carry only one sheet, to seal the enclosed structure from wind and rain, or two parallel sheets to also assist significantly in thermally insulating the enclosed space. If desired, further insulation may be achieved by blowing or otherwise depositing in the space between the two flexible sheets an insultating material 48 (some of which is shown in FIG. 2) such as shredded styrofoam. This material may be left in place, or may it be blown in to insulate the enclosed environment during periods of thermal stress, such as at night, then sucked out of this space the next morning to again render the panel transparent to sunlight.

Intersecting channel members, as shown in FIG. 6, may be connected by an angle bracket 52, this angle bracket being mechanically attached to the end portions of the intersecting channel members by one or more screws 54. Of course, while the holes in the channel members and in the angle bracket to receive these screws may be predrilled, still to mechanically attach intersecting channel members in this fashion can require appreciable time, and can exhaust the assembler. To avoid both of these effects, a unique angle bracket as illustrated in FIG. 7 may be employed. This angle bracket 60, in one embodiment, includes two legs at right angles to one another, leg 62 and leg 64. Each leg includes a longitudinal resilient tab or finger 66, which may be formed as part of the angle bracket or which may be a separately attached member depending upon manufacturing preferences. This flexible tab includes an outstanding button 68 at its outer end.

As shown in FIG. 3, the channel member may be formed with lateral walls 72 extending inwardly from the side walls 22. These lateral walls are spaced from base 24 a distance just sufficient to receive the legs of the angle bracket 60. As shown in FIG. 8, when so received each button 68 will snap into an opening 74 within the base of a channel member thereby locking the angle bracket to each channel member against longitudinal sliding movement. Of course, the angle bracket itself, when captured between lateral portion 72 and base 24 of the channel member, prevents the angle bracket from rotating relative to the channel member. By this arrangement, the intersecting channel members easily and quickly may be connected simply by sliding the angle bracket into the slots defined in the channel members.

By employing angle brackets, such as illustrated in FIGS. 6 or 7, the four intersecting side members of the panel may be interconnected. One or two flexible sheets may be attached to these interconnected channel members by resilient splines, the splines capturing the side edges of the sheets with the longitudinal grooves provided in the channel members. Typically these panel members might be 6 feet by 8 feet or more in size. Since it is preferred that the flexible panels be fairly taught, these panels can transmit substantial force to the channel members supporting them, particularly when subjected to wind loads. While the shape of these channel members provides appreciable structural stiffness, nevertheless it is preferred to incorporate in the panels which are of substantial size diagonal stiffening bars 78, four of which are shown in FIG. 2. These stiffening bars include end tabs that seat against the interior portion of base 24 of the channel members, and which may be screwed or otherwise attached thereto as previously described with respect to the angle brackets. These diagonal members may be simply tubular cross-braces or right angle bars in cross-section. Also, if further stiffness is desired, additional braces or bars may be included in the panel, these additional elements extending laterally across the panel to interconnect opposite, rather than intersecting, channel members.

By the structure just described, an easily assembled, inexpensive, durable basic building panel is provided. Many of these panels will be interconnected with one another such that their respective planes define substantially a right angle with one another. Other panels will be interconnected with one another such that their respective planes are substantially in line (i.e., parallel). A right angle connection of adjacent panels is shown, in cross-section, in FIG. 9. To achieve this interconnection, a link member 80 is employed. This link member includes longitudinal grooves 82, generally circular in shape, which receive bosses 28 of the channel members. Specifically, to achieve this interconnection the adjacent panels are positioned in generally the illustrated orientation, then link member 80 is slid down over bosses 28 of these channel members, its longitudinal grooves 82 receiving these bosses. Preferably, the channel members are shaped so as to provide a chamfered corner, or bisecting wall 84, between each side wall and the base of the channel member. Thus, when adjacent channel members are linked together by link member 80, these corner wall portions 84 will face one another. Preferably, the dimensions of the various elements of the channel member are such that when linked together as shown in FIG. 9, a resilient gasket 86 may be received between these corner walls to seal one wall to the other, this resilient gasket preferably being adhesively attached to one or both channel members. While such a gasket, together with link member 80, will substantially seal the channel members, one to the other, as well as accommodating any slight variation in manufacturing tolerances of these associated elements, to afford an additional seal between these panels preferably the link member includes a third longitudinal groove 88 which receives an outstanding boss 92 formed in a molding or edge panel 94, the lateral dimension of this panel being sufficient to span the distance between the outer edges of the interlinked channel member as shown in FIG. 9. Also, preferably this molding panel is somewhat resilient, being formed for example of an extruded thermoplastic material, and may include at each longitudinal edge an enlargement 96 that seats over side portion 38 of the keyhole-shaped longitudinal groove in the channel member, as shown in FIG. 9. By this molding panel not only are the adjacent wall panels further sealed to one another against intrusion by wind and moisture, but also a pleasing visual finish is provided for the building.

When three panels intersect at substantial angles to one another, to define a corner as shown in FIG. 10, an end cap 102 may be provided to snap over the adjacent end edges of molding panels 94 and seal them to one another. Alternatively, the eges of these end panels may be cut in a complimentary fashion to lie quite close to one another, then the space between them spanned and sealed by a piece of tape or similar sheet sealant (not shown).

Conventionally a greenhouse is placed on an earthen floor. Thus, preferably the building structure shown in FIG. 1 includes bottom channel members 18 which are constructed as illustrated in vertical cross section in FIG. 11. These bottom channel members include, in addition to side walls and a base similar in construction to that illustrated in FIG. 3, a flange 110 preferably in line with the plane defined by one of the side walls, forming a '4'-shaped channel. This flange 110 may be attached to a wooden beam 112 underlining and defining the outer periphery of the building structure, as by screws or nails 114 received in openings in the flange. Preferably beam 112 is bolted to an underlying wooden base beam 116, both beams being received in earth, the upper surface of beam 112 lying generally in the plane defined by the earthen floor of the structure, all as indicated in FIG. 11. While alternatively a channel shaped as the vertical channel members 14 shown in FIG. 3 could be employed as the bottom channel 18, the planar wall 26 being affixed to beam 112, preferably an 'h'-shaped bottom channel member 18, illustrated in FIG. 11, is employed.

The building also includes at least one door 10, and preferably one or more windows 12 for ventilation, all as shown in FIG. 1. A door jamb is shown in cross section in FIG. 12. An identical construction also may be employed for a window jamb. In general, the door (or window) is formed by channel members 120. These channel members are generally 'h'-shaped in cross-section, and include a planar wall portion or flange 122. The channel members defining the door (or window) opening in the building preferably are identical to channel members 120, to result in double baffle to passage of wind and rain between the door (or window) and its joint. The door (or window) is hinged to one of these channel members to open a direction to moving away from flanges 122, and conversely to close against flanges 122. Appropriate door (or window) latching hardware may be attached to adjacent channel members to hold the door (or window) closed.

Since it is often desired to locate such a door (or window) adjacent one vertical edge of the building structure, it is necessary to be able to appropriately connect the door (or window) to the vertical channel member defining this edge. Such an arrangement is illustrated in FIG. 13. This vertical edge is defined by longitudinally adjacent channel members 14 similar in construction to those illustrated in FIG. 9. As shown in both of these figures, the side walls of the channel member include at their outer ends an interior enlargement 130. A U-shaped channel member 132 includes longitudinal grooves 134, the side of the channel member and location of these grooves being such that the channel member 132 is snuggly received within, and linked to, channel member 14. The outer face of the base wall in channel member 132 defines one side of the door (or window) opening, preferably the side to which the door (or window) is hinged.

To be able to longitudinally extend the building structure to enclose such floor area as desired, it is necessary to be able to attach panels to one another such that the planes defined by the panels are co-planar. Specifically, such as attachment is required both for the side walls of the building and for the roof of the building. To this end, it is possible to employ as such adjacent, attached channel members the 'h'-shaped channel member 136 shown in FIG. 14. The flanges of such adjacent channel members preferably are positioned, as shown in FIG. 14, one on the interior and the other on the exterior of the building, and are screwed or otherwise attached by member 138 each to the side wall of the adjacent channel member. While such an arrangement and attachment is feasible, for most constructions it is preferred to employ the channels illustrated in FIG. 15 as such adjacent channel members. These adjacent channel members 140 also are U-shaped, include keyhole-shaped longitudinal grooves in their side walls, all as previously described with respect to FIGS. 3 and 4, and a series of exterior flanges 142 along their base. These flanges 142 are configured such that two sections of the channel member, one rotated 180 degrees relative to the another may be interlocked with one another by sliding the T-shaped flange into the T-shaped groove when the configuration illustrated in FIG. 15 is employed. Thus, adjacent wall and roof panels may be positively and mechanically locked to one another quickly, easily, and completely along their adjacent side walls simply by sliding one side wall onto the other. Since each panel will be slightly different in size than the others due to manufacturing tolerances, to accommodate such variations in dimensions, preferably the exterior surfaces of these interlocked side wall channels include opposed circular shaped longitudinal grooves 144 which may receive lengths of spline 146 (identical to spline 44) as illustrated in FIG. 15, these resilient splines both sealing the side walls to one another and permitting the adjacent walls to adjust to one another to accommodate such variations in manufacturing dimensions as well as thermal-induced dimensional changes of the members.

As has been described, the building structure consists of a series of channel members, preferably all in the five to eight foot length range, which are interconnected by members of similar length and reinforced by various cross-bars and diagonal members, none of which are any longer than the longest channel member. Spanning the spaces defined by such interconnected channel members are various flexible panels, which panels may be rolled up for storage and transportation. In a preferred embodiment, the intersecting channel members may be interconnected with one another simply by snapping an angle bracket into one or both of the intersecting channel members. The holes for attaching the various attaching members to one another also may be predrilled in the channel members. Since the building is formed of such simple, basic shapes, its components may be easily and compactly packaged as shown in FIG. 16. Preferably, this package includes a cardboard sheet 152 which is folded to define at least two interior spaces 154 and 156. Space 154 may receive rolls of the panel material; space 156 may receive the various channel members, their interconnecting brackets and hardware, and the resilient spline as well as directions for assembly of the panels and building.

While the building structure provides an easily erectable, prefabricated greenhouse structure, it is also quite capable of providing a variety of other structures. For example, instead of the flexible sheet members spanning the spaces between the intersecting channels of a panel, solid wall sheets or panels may be employed. As an example, once the intersecting channel members have been connected to one another, they may be placed in a jig or form and a polyurethane foam added to fill the space defined by the panels, providing, when hardened, an excellent, easily assembled building panel. Of course, the form defining the space for receiving the foam may incorporate a pattern such as one simulating the adjacent surface elements of a conventional building structure (e.g., bricks, shingles, etc.), to provide any desired pattern or texture to the surface of the resulting member. Also, while the channel members have been illustrated as being straight, they could be curved, too, the structure being just as easily assembled providing such curvature is constant or uniform throughout.

An example of such a structure is shown in FIG. 17. It incorporates a series of sidewall panels 162, one or more of which may include a door or window opening 164, and a series of arched, pie-shaped dome segments 166. Such a structure as illustrated is quite suitable for use as an easily erectable building about a hot tub, for example. The panels 162 may incorporate textured polyurethane foam, in which case, of course, the longitudinal grooves 32 in the channel members previously described would not be necessary. However, as shown in FIG. 18, a view of a portion of the building shown in FIG. 17 taken on line XVIII, preferably the channel members 172 which define each of the panels include one or more inwardly projecting ridges 174 which interlock it with the foam panel 176. These channels 172 may be attached to adjacent channels by the interlocking structures already described, such structures being illustrated, for example, in FIGS. 8, 12 and 14 of the drawings. Also, as has been noted one or more window or door openings may be provided in these panels, such openings being defined by interconnected channels 178. Of course suitable plumbing and electrical conduits 180 also may be incorporated in these panels.

It is desirable to include at the top of the dome roof of the building structure, a ventilating fan and lighting fixture 182, this fixture extending through and being received in an opening formed by terminating each pie-shaped dome segment with a short channel member to eliminate its point or apex. Alternatively, an opening may be cut in the foam panel of one of the dome segments 166 and fixture 182 mounted in that opening. Further, as illustrated in FIG. 17, the channel members 184 which form the top and bottom sides of the wall panels may be curved, and the side channel members 188 forming the roof panels also may be curved, the curves of adjacent panel members being, of course, complimentary to one another. Further, these channel members all may be bent to an arc of the same radius throughout, rendering them interchangeable and further simplifying the assembly.

Clearly, variations in each of the elements just described may be preferred by other designers skilled in this field. Accordingly, as previously noted the scope of the invention should not be limited just to the disclosed preferred embodiments, but rather is set forth in the following claims.

I claim the right to exclude others from making, using, or selling:

1. A channel member, at least one side wall of which includes a longitudinal groove for receiving an edge portion of a flexible sheet and a resilient spline, the improvement comprising, the groove being generally keyhole-shaped in cross-section, the keyhole including a generally circular interior head opening, a constricted throat portion, and planar side portions contiguous with the side wall of the channel member, the side wall surfaces extending between the head opening and the side wall, one side portion defining an acute angle with respect to a plane tangent to the interior head opening at their line of intersection that is substantially less than the acute angle defined by the other side portion with the plane tangent to the interior head opening at their line of intersection.

2. A channel member as set forth in claim 1 including means to connect it to a second channel member whose major axis is generally parallel to the major axis of the first channel member.

3. A channel member as set forth in claim 2 in which said connecting means includes a planar wall portion connected to the side wall and terminating in an outer enlarged boss, whereby a link member including openings to receive the bosses may slide over parallel bosses and capture within it each boss to interconnect the channel members.

4. A channel member as set forth in claim 3 in which the planar wall is offset from the side wall, the size of the side wall, the planar wall and its offset being such that adjacent, similar channel members abut when the planes defined by the side walls are substantially at right angles to one another.

5. A channel member as set forth in claim 4 in which a portion of the channel member interconnecting the side wall and the planar wall includes a beveled face at an angle to the side wall and planar wall such that it bears flat against the corresponding face of a similar channel member when their respective side walls are substantially at right angles to one another.

6. A channel member as set forth in claim 1 in which channel member is generally U-shaped, the side walls of the "U" each including said keyhole-shaped longitudinal groove, whereby the channel member may hold two flexible sheets in generally parallel planes, the edge portions of the respective sheets being received and captured within their respective keyhole-shaped longitudinal grooves.

7. A channel member as set forth in claim 6 in which a flange extends outwardly from the base of the "U" in a plane generally parallel to the side walls of the "U" but in an opposite lateral direction to the side walls, whereby this flange may be connected to a member such as a similarly shaped channel or wooden beam.

8. A channel member as set forth in claim 7 in which the flange lies generally in the plane of one of the side walls.

9. A building panel of generally rectangular shape consisting of peripheral channel members and a flexible sheet spanning the space defined by the channel members, the edge portions of the flexible sheet being captured within longitudinal grooves provided in the channel members, at least one resilient spline received within said longitudinal grooves and holding the edge portions of the flexible sheet to the channel members, the longitudinal groove being generally keyhole-shaped in cross-section, the keyhole including a generally circular interior head opening, a constricted throat portion, and planar side wall portions connected to the side wall of the channel member, the side wall surfaces extending between the head opening and the side wall, the side portion over which the sheet edge portion under tension passes defining an angle with respect to the side wall is substantially different than the angle defined by the other side portion with the side wall, the side portion over which the sheet edge portion under tension passes also defining an acute angle with the plane tangent to the interior head opening at their line of intersection that is substantially less than the acute angle defined by the other side portion with the plane tangent to the interior head opening at their line of intersection, and means attaching the channel members together at their intersecting corners.

10. A building panel as set forth in claim 9 including means to connect a peripheral channel member to a second channel member whose major axis is generally parallel to the major axis of the peripheral channel member.

11. A building panel as set forth in claim 10 in which said connecting means includes a planar wall portion connected to the side wall and terminating in an outer enlarged boss and a link member including openings to receive the bosses of adjacent channel members, whereby the link member may be slid over parallel bosses and capture within it each boss to interconnect the channel members.

12. A building panel as set forth in claim 11 in which the planar wall of the channel member is offset from the side wall, the size of the side wall, the planar wall and its offset being such that adjacent similar channel members abut when the planes defined by the side walls are substantially at right angles to one another.

13. A building panel as set forth in claim 12 in which a portion of the channel member interconnecting the side wall and the planar wall includes a beveled face at an angle to the side wall and planar wall such that it bears flat against the corresponding face of the interconnected channel member when their respective side walls are substantially at right angles to one another.

14. A building panel as set forth in claim 9 in which the peripheral channel members are generally U-shaped, the side walls of the "U" each including said keyhole-shaped longitudinal groove, and further including two flexible sheets, the peripheral channel members holding two flexible sheets in generally parallel planes, and at least one resilient spline in each longitudinal groove, the edge portions of the respective sheets being received and captured by the spline within their respective keyhole-shaped longitudinal grooves, one on either side of the peripheral channel members.

15. A building panel as set forth in claim 14 in which at least one peripheral channel number includes a flange extending outwardly from the base of the "U" in a plane generally parallel to the side walls of the "U", but in an opposite lateral direction to the side walls, whereby this flange may be connected to a member such as a channel member or wooden beam to which the building panel is to be attached.

16. A building panel as set forth in claim 15 in which the flange lies generally in the plane of one of the side walls.

17. A building panel as set forth in claim 9 in which the means connecting the ends of the intersecting peripheral channel members together includes an angle bracket, the channel member being generally U-shaped and including interior lateral wall portions which are spaced from the base of the "U" sufficiently to receive and capture the angle bracket between the lateral wall portions and the base, the angle bracket including a resilient tab, a button attached to the outer portion of the tab, the tab urging the button against the interior surface of the base when the angle bracket is received between the lateral walls and the base, the base including an opening to receive the button when the angle bracket is fully inserted in the base, the button thereby connecting the angle bracket to the base and assisting in locking the abutting channel members to one another.

18. A building structure formed with a plurality of panels, the periphery of the panels being defined by channel members, the channel members including outwardly projecting planar wall portions, each having an outer enlarged boss, link means attaching adjacent elements of panels which are at a substantial angle to one another, the link means including cavities to receive and capture each of said bosses to thereby interlock the adjacent channel members, the elements of adjacent panels lying in generally the same plane being interlocked with one another to attach such panels together, whereby the panels are interlocked with one another to form a building structure.

19. A building structure as set forth in claim 18 including a molding panel having longitudinal edges engaging the outer edge portions of said adjacent channel members of panels which are substantial angles to one another, the molding panel including an upstanding boss adjacent to the link member when the outer edge portions of the molding panel bear against the outer edges of the adjacent channel members, the link member including a cavity for receiving and capturing the boss of the molding panel whereby the molding panel is held to the building structure and assist in sealing the adjacent panels to one another.

20. A building structure set forth in claim 19 in which the channel members are U-shaped channel members, and in which adjacent panels lying at a substantial angle to one another are chamfered to provide a corner wall portion, the dimensions of the U-shaped channel members, corner wall portions, planar wall portions, and link member being such that the corner walls of adjacent channel members face one another when the channel members are attached to one another by the link member.

21. A building structure as set forth in claim 20 including a resilient molding strip received between and bearing simultaneously on the facing corner wall portions of adjacent channel members.

22. A building structure as set forth in claim 21 in which the panels include flexible sheets spanning the space between the channel members, the channel members including longitudinal grooves for receiving and holding the peripheral portions of the flexible sheets, and means for holding the peripheral portions of the flexible sheets in the longitudinal grooves of the channel member.

23. A building structure as set forth in claim 22 in which both side walls of each U-shaped channel include said longitudinal channel slots whereby either one or two flexible sheets may be employed to span the space defined by the channel members.

24. A building structure as set forth in claim 23 including two spaced, parallel flexible sheets spanning the space between the channel members of at least some of the panels of the building structure, and means to selectively fill the space between the two sheets with an insulating material.

25. A building structure as set forth in claim 24 in which the longitudinal grooves of the channel members are generally keyhole-shaped in cross-section, the keyhole including a generally circular interior head opening, a constricted throat portion, and planar side wall portions connected to the side wall of the channel member, the side portion over which the sheet edge portion under tension passes defining an angle with respect to the side wall which is less than the angle defined by the other side portion with the side wall, the side portion over which the sheet edge portion under tension passes also defining an angle with the place tangent to the interior head opening at their line of intersection that is greater than the angle defined by the other side portion with the plane tangent to the interior head opening at their line of intersection, and means attaching the channel members together at their intersecting corners.

26. A building structure as set forth in claim 25 in which the means connecting the ends of intersecting channel members together includes an angle bracket, at least some of the channel members being generally U-shaped and including interior lateral wall portions which are spaced from the base of a "U" sufficiently to receive and capture the angle bracket between the lateral wall portions and the base, the angle bracket including a resilient tab, a button attached to the outer portion of the tab, the tab urging the button against the interior surface of the base when the angle bracket is received between the lateral walls and the base, the base including an opening to receive the button when the angle bracket is fully inserted in the base, the button thereby connecting the angle bracket to the base and assisting in locking the intersecting channel members to one another.

27. A building structure as set forth in claim 26 in which the outwardly projecting elements of adjacent channel members lying in generally the same plane are identical in shape, one set of elements, being laterally rotated 180° with respect to the other set of elements, whereby the same channel member extrusion may be employed as the adjacent peripheral channel members of adjacent panels, their complimentary shapes interlocking them with one another.

28. A building structure as set forth in claim 27 in which the complimentary-shaped adjacent peripheral channel members include opposed grooves, and a resilient spline being received in these opposed grooves of adjacent channel members whereby the adjacent channel members may be sealed to one another to compensate for normal variations in manufactured dimensions of the panels, and for thermally induced dimensional variations in the panel members.

29. A building structure as set forth in claim 21 in which the panels include rigid foam sheets spanning the space between the channel members, the channel members including projecting ridges for interlocking them with the foam sheets.

30. A building structure as set forth in claim 29 in which at least some of the foam sheets bear a surface texture pattern simulating in appearance the adjacent surface elements of a conventional building structure.

31. A building structure as set forth in claim 29 in which at least one of the foam sheets incorporates interconnected channel members defining an opening through the sheet.

32. A building structure as set forth in claim 21 in which at least some of the channel members are curved.

33. A building structure as set forth in claim 32 in which adjacent channel members are curved, the radius of curvature of adjacent channel members being equal and uniform throughout the channel member.

* * * * *